US010394687B2

(12) United States Patent
Yoon et al.

(10) Patent No.: US 10,394,687 B2
(45) Date of Patent: Aug. 27, 2019

(54) METHOD FOR CLASSIFYING ALARM TYPES IN DETECTING SOURCE CODE ERROR AND NONTRANSITORY COMPUTER READABLE RECORDING MEDIUM THEREFOR

(71) Applicant: Sparrow Co., Ltd., Seoul (KR)

(72) Inventors: Jongwon Yoon, Seoul (KR); Minsik Jin, Seoul (KR)

(73) Assignee: SPARROW CO., LTD., Seoul (KR)

( * ) Notice: Subject to any disclaimer, the term of this patent is extended or adjusted under 35 U.S.C. 154(b) by 14 days.

(21) Appl. No.: 15/528,792

(22) PCT Filed: Nov. 26, 2015

(86) PCT No.: PCT/KR2015/012792
§ 371 (c)(1),
(2) Date: May 23, 2017

(87) PCT Pub. No.: WO2016/085273
PCT Pub. Date: Jun. 2, 2016

(65) Prior Publication Data
US 2017/0329694 A1 Nov. 16, 2017

(30) Foreign Application Priority Data
Nov. 28, 2014 (KR) ........................ 10-2014-0168971
Feb. 27, 2015 (KR) ........................ 10-2015-0028436

(51) Int. Cl.
*G06F 11/36* (2006.01)

(52) U.S. Cl.
CPC ................................ *G06F 11/3608* (2013.01)

(58) Field of Classification Search
CPC .................................................. G06F 11/3608
See application file for complete search history.

(56) References Cited

U.S. PATENT DOCUMENTS 9,223,554 B1 * 12/2015 Lawson .................... G06F 8/54
10,055,329 B2 * 8/2018 Abadi ....................... G06F 8/00
(Continued)

FOREIGN PATENT DOCUMENTS

EP 2369529 9/2011

OTHER PUBLICATIONS

Korean Patent Office, International Search Report, Application No. PCT/KR2015/012792, dated Mar. 2, 2016.
(Continued)

*Primary Examiner* — Matthew M Kim
*Assistant Examiner* — Indranil Chowdhury
(74) *Attorney, Agent, or Firm* — Lex IP Meister, PLLC

(57) ABSTRACT

The present invention relates to a method for classifying alarm types in detecting source code errors, a computer program therefor, and a recording medium thereof. The method for classifying alarm types in detecting source code errors includes: receiving input of alarm path information about an occurring error detection alarm and source code information that is an object associated with the occurring alarm, the alarm path information being information about an execution path related to the error detection; converting the source code into an abstract syntax tree (AST); removing, from the AST, an unnecessary sub-tree that is not related to the error detection alarm; obtaining a feature vector of the AST having the unnecessary sub-tree removed therefrom based on a preset feature pattern set; and classifying, by types, the error detection alarm associated with the feature vector by clustering the obtained feature vector using a preset method.

6 Claims, 1 Drawing Sheet

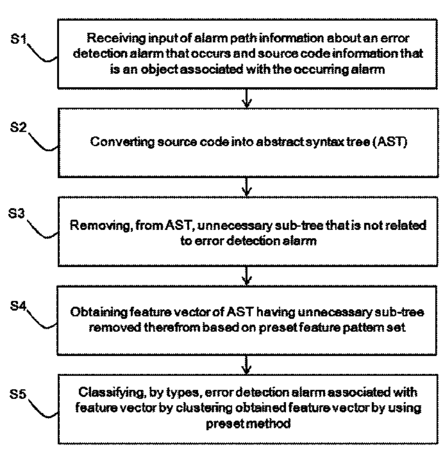

(56) References Cited

U.S. PATENT DOCUMENTS

| | | | | |
|---|---|---|---|---|
| 2007/0277163 | A1* | 11/2007 | Avresky | G06F 8/43<br>717/140 |
| 2010/0333069 | A1 | 12/2010 | Chandra et al. | |
| 2011/0078651 | A1 | 3/2011 | Ovadia et al. | |
| 2012/0216280 | A1 | 8/2012 | Zorn et al. | |
| 2013/0145215 | A1 | 6/2013 | Pistoia et al. | |
| 2015/0363294 | A1* | 12/2015 | Carback, III | G06F 8/37<br>717/132 |

OTHER PUBLICATIONS

Korean Patent Office, Office Action, Application No. 10-2015-0028436, dated Mar. 7, 2016.

Korean Patent Office, Office Action, Application No. 10-2015-0028436, dated Nov. 24, 2016.

* cited by examiner

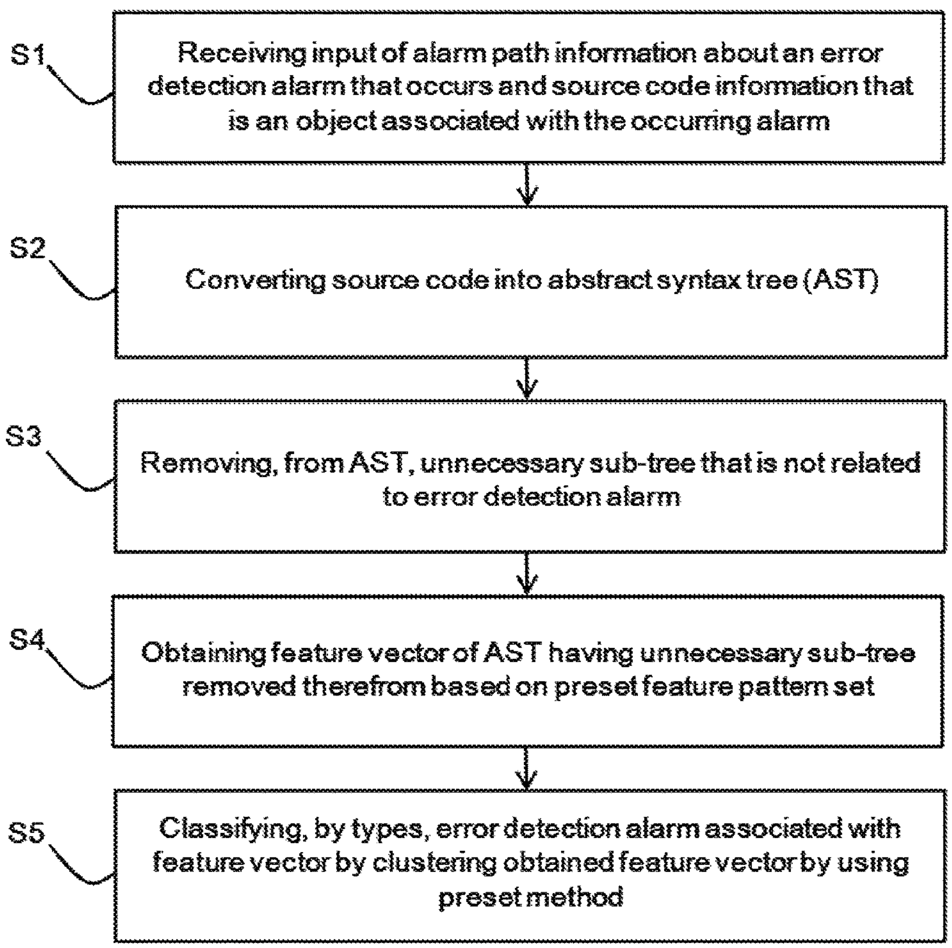
S1
Receiving input of alarm path information about an error detection alarm that occurs and source code information that is an object associated with the occurring alarm
S2
Converting source code into abstract syntax tree (AST)
S3
Removing, from AST, unnecessary sub-tree that is not related to error detection alarm
S4
Obtaining feature vector of AST having unnecessary sub-tree removed therefrom based on preset feature pattern set
S5
Classifying, by types, error detection alarm associated with feature vector by clustering obtained feature vector by using preset method

METHOD FOR CLASSIFYING ALARM TYPES IN DETECTING SOURCE CODE ERROR AND NONTRANSITORY COMPUTER READABLE RECORDING MEDIUM THEREFOR

TECHNICAL FIELD

The present invention relates to a method for classifying alarm types in detecting source code errors, a computer program therefor, and a recording medium therefor, and the present invention relates to a method for classifying alarm types in detecting source code errors, a computer program therefor, and a recording medium therefor that are capable of automatically classifying and analyzing various types of alarms related to source code errors occurring in a static analyzer, and preventing wasting of resources required for performing the alarm type classification.

BACKGROUND ART

Static analyzers are widely used to find potential bugs or vulnerabilities in a source code. Static analyzers detect errors that are predefined by respective checkers by executing respective functions thereof, and generate alarm messages when such errors are detected.

When the static analyzer generates an alarm, a process of classifying the alarm types may be performed to analyze the accuracy of the generated alarm.

For example, the static analyzer may not always correctly determine errors while analyzing. Accordingly, a false alarm may be generated by mistakenly determining that an error exists even though there is no error in the source code to be analyzed.

Herein, a type of a generated alarm may be analyzed and classified to respond to an additional analysis of an alarm type with high possibility of false alarm. In general, operations of classifying alarm types have conventionally been performed manually by a developer, such an alarm type classification process is a waste of resources.

DISCLOSURE

Technical Problem

Accordingly, the present invention has been made keeping in mind the above problems occurring in the prior art, and an object of the present invention is to provide a method for classifying alarm types in detecting source code errors, a computer program therefor, and a recording medium therefor that are capable of automatically classifying and analyzing various types of alarms related to source code errors occurring in a static analyzer, and preventing wasting of resources required for performing the alarm type classification.

Technical Solution

According to one aspect of the present invention to accomplish the above object, there is disclosed a method for classifying alarm types in detecting a source code error, the method being executed in an alarm type classifying apparatus co-working with a static analyzer, and is for classifying error detection alarms occurring in the static analyzer by types, the method including: 1) receiving input of alarm path information about an error detection alarm that occurs and source code information that is an object associated with the occurring alarm, the alarm path information being information about an execution path related to the error detection alarm among execution paths of the source code; 2) converting the source code into an abstract syntax tree (AST); 3) removing, from the AST, an unnecessary sub-tree that is not related to the error detection alarm; 4) obtaining a feature vector of the AST having the unnecessary sub-tree removed therefrom based on a preset feature pattern set; and 5) classifying, by types, the error detection alarm associated with the feature vector by clustering the obtained feature vector using a preset method.

Preferably, in the present invention, the receiving of the alarm path information and source code information input may further receive input of alarm type information about the occurring error detection alarm, the alarm type information is information about an alarm type associated with the occurring error detection alarm among preset alarm types, and in the obtaining of the feature vector of the AST having the unnecessary sub-tree removed therefrom based on the preset feature pattern set, the preset feature pattern set may be preset for the alarm type of the error detection alarm.

Preferably, the removing of the unnecessary sub-tree may be performed based on at least any one of: a first policy of removing general statements except for statements which are executed within an execution path related to the error detection alarm; a second policy of removing branch nodes that are not executed branch nodes within the execution path related to the error detection alarm, wherein the execution path related to the error detection alarm includes information about condition determination results of branch nodes; a third policy of removing loop statements that are not executed loop statements within the execution path related to the error detection alarm; a fourth policy of including a called function within the execution path related to the error detection alarm and an execution path thereof as a sub-tree of a node which calls the function; and a fifth policy of removing declarations that are not related to the execution path related to the error detection alarm.

Preferably, in the obtaining of the feature vector, the preset feature pattern set may be configured in a set form of n preset feature patterns, and the feature pattern may be any one of occurrences of conditional statements, occurrences of loop statements, occurrences of return statements, occurrences of break or continue statements, occurrences of exit or assert method invocations, occurrences of null expressions, occurrences of comparisons with a null value, occurrences of null assignments, and occurrences of the statements which return a null value.

Preferably, the obtaining of the feature vector (V(R)) of the AST having the unnecessary sub-tree removed therefrom may include: 401) defining a feature pattern set (P) configured in a set form of n preset feature patterns (p) as the formula 1 below:

$$P=\{p_1,p_2, \ldots ,p_n\}; \quad \text{[Formula 1]}$$

402) defining an n-dimensional pattern satisfaction vector (v(P, d)) for an arbitrary node within the AST as the formula 2 below:

$$v(P,d)=\langle S(d,p_1),S(d,p_2), \ldots ,S(d,p_n)\rangle \quad \text{[Formula 2]}$$

(Wherein, $S(d,p_i)$ is a factor that indicates whether or not a node d or a sub tree of a root d is matched to an ith feature pattern pi, and is defined as the formula 3 below. The ith feature pattern ($p_i$) may be a single node or a sub-tree, $$S(d, p) = \begin{cases} 1 & \text{if } d \text{ satisfies } p \\ 0 & \text{otherwise} \end{cases}; \quad \text{[Formula 3]}$$

403) defining a feature vector (V(P,D)) for an arbitrary node within the AST by using the formula 4 below:

$$V(P,D)=V(P,d_1)+ \ldots +V(P,d_m)+v(P,D) \quad \text{[Formula 4]}$$

(Wherein, $d_1, \ldots, d_m$ are children nodes of D, $(V(P,d_1) \ldots V(P, d_m))$ are feature vectors of $d_1, \ldots d_m$ that are obtained by using the formula 4, and v(P,D) is an n-dimensional pattern satisfaction vector of an arbitrary node D); and 404) obtaining a feature vector (V(R)) of the AST having the unnecessary sub-tree removed therefrom by using the formula 5 below:

$$V(R)=V(P,R)=V(P,d_1)+ \ldots +V(P,d_m)+v(P,R) \quad \text{[Formula 5]}$$

(Wherein, R is a root node of the AST having the unnecessary sub-tree removed therefrom, and corresponds to the node D of the formula 4).

Preferably, in the classifying of the error detection alarm, the clustering of the obtained feature vector may be performed by using a K-means algorithm.

According to another aspect of the present invention, there is disclosed a computer program stored in a medium to execute a method for classifying alarm types in detecting source code errors by being coupled to hardware.

According to another aspect of the present invention, there is disclosed a computer readable recording medium wherein a computer program to execute a method for classifying alarm types in detecting source code errors is stored.

Advantageous Effects

According to the invention as described above, when detecting errors of a source code by using a static analyzer, there is an advantage of classifying and analyzing types of alarms that occur and allowing additional analyses and responses to alarm types with high possibility of false alarm.

Particularly, according to the present invention, classification of alarm types is performed by an automated process rather than being manually performed by a developer, thus wasting of resources required for performing the alarm type classification may be prevented.

DESCRIPTION OF DRAWINGS

FIG. 1 is a conceptual diagram showing a method for classifying alarm types in detecting source code errors according to an embodiment of the present invention.

MODE FOR INVENTION

It should be noted that the present invention may be embodied in many different forms without departing from the spirit and significant characteristics of the present invention. Therefore, the embodiments of the present invention are disclosed only for illustrative purposes and should not be construed as limiting the present invention.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element. The term "and/or" includes any and all combinations of one or more of the associated listed items.

It should be understood that when one element is referred to as being "connected to" or "coupled to" another element, it may be connected directly to or coupled directly to another element, or be connected to or coupled to another element having the other element intervening therebetween. On the other hand, it is to be understood that when one element is referred to as being "connected directly to" or "coupled directly to" another element, it may be connected to or coupled to another element without the other element intervening therebetween.

Terms used herein are used only in order to describe specific embodiments rather than limiting the present invention. As used herein, the singular forms are intended to include the plural forms as well, unless the context clearly indicates otherwise. It will be further understood that the terms "comprises" or "have" used in this specification, specify the presence of stated features, processes, operations, components, parts, or a combination thereof, but do not preclude the presence or addition of one or more other features, numerals, processes, operations, components, parts, or a combination thereof.

Unless otherwise defined, all terms including technical and scientific terms used herein have the same meaning as commonly understood by one of ordinary skill in the art to which the present invention belongs. It should be understood that the terms defined by the dictionary are identical with the meanings within the context of the related art, and they should not be ideally or excessively formally defined unless the context clearly dictates otherwise in this specification.

Hereinafter, exemplary embodiments of the invention will be described in detail with reference to the accompanying drawings. The same or corresponding elements will be consistently denoted by the same respective reference numerals and described in detail no more than once regardless of drawing symbols. When the functions of conventional elements and the detailed description of elements related with the present invention may make the gist of the present invention unclear, a detailed description of those elements will be omitted.

FIG. 1 is a conceptual diagram showing a method for classifying alarm types in detecting source code errors according to an embodiment of the present invention.

The invention according to the present embodiment is executed in an alarm type classifying apparatus that co-works with a static analyzer, and relates to a method for classifying error detection alarms by types that occur in the static analyzer.

In one embodiment, the alarm type classifying apparatus may be understood as a computing means or a functional module which implements a method for classifying alarm types, the apparatus may be implemented in a form of a module that is capable of co-working with the static analyzer, or may be implemented as an internal module of the static analyzer.

The alarm type classifying apparatus of the present embodiment co-works with various known static analyzers. In one embodiment, the static analyzer(static analysis tool) is well known through various commercial products with analysis methods that are based on a syntactic base or on a semantic base, thus the detailed description thereof is omitted.

In step S1, the alarm type classifying apparatus receives input of alarm path information about error detection alarms that occur and source code information that are objects associated with the occurring alarms. In one embodiment, the inputs may be provided by an input request of the alarm type classifying apparatus, or may be provided to the alarm type classifying apparatus by a static analyzer co-working with the alarm type classifying apparatus and which provides the information based on setting of the static analyzer. In another embodiment, the input may be performed by a method of inputting a file in which the above information is recorded by a user so that the alarm type classifying apparatus may read out the file.

The alarm path information is information about execution paths related to the error detection alarms that occur among execution paths of a source code.

The static analyzer detects errors of an object source code through function executions of respective checkers based on conditions predefined for respective checkers, when the static analyzer determines that an error is detected, the static analyzer generates a specific alarm for the detected error.

Herein, the generation of the alarm is performed by outputting a specific alarm message that is preset for the detected error in the checker. Each alarm message may be basically dependent on a specific checker. In general, each alarm message does not reflect a format or a characteristic of a source code, or a characteristic of an execution path.

Preferably, in step S1, the alarm type classifying apparatus further receives input of alarm type information about the error detection alarms that occur.

A single 'alarm type' includes an identical alarm message. In one embodiment, a single checker generates a single alarm message. It may be understood that a single checker defines a single 'alarm type'

In one embodiment, for example, the 'alarm type' may be 'general null dereference', 'dereferencing of an unchecked null value', and 'dereferencing of a returned null value', etc. In addition, various alarm types may be set.

In one embodiment, a feature pattern set that will be described later may be set for respective alarm types.

In step S2, the alarm type classifying apparatus converts the source code into an abstract syntax tree (AST).

The abstract syntax tree (AST) is a tree having an abstract syntax structure of a source code that is written in a programming language, and each node of the above tree represents a structure occurring in the source code. The detailed concept of the abstract syntax tree may be understood through a large number of known references, so a detailed description thereof is omitted.

In step S3, the alarm type classifying apparatus removes an unnecessary sub-tree that is not related to the error detection alarms from the abstract syntax tree.

The removing of the unnecessary sub-tree may be performed based on a conventional rule-based technique.

In one embodiment, the removing of the unnecessary sub-tree is performed based on at least any one of: a first policy of removing general statements except for statements which are executed within an execution path related to the error detection alarm; a second policy of removing branch nodes that are not executed branch nodes within the execution path related to the error detection alarm, the execution path related to the error detection alarm includes information about condition determination results of branch nodes; a third policy of removing loop statements that are not executed loop statements within the execution path related to the error detection alarm; a fourth policy of including a called function within the execution path related to the error detection alarm and an execution path thereof as a sub-tree of a node which calls the function; and a fifth policy of removing declarations that are not related to the execution path related to the error detection alarm.

In step S4, the alarm type classifying apparatus obtains a feature vector of the abstract syntax tree having the unnecessary sub-tree removed therefrom based on a preset feature pattern set.

The abstract syntax tree obtained from the source code is too large and has a complex structure to be used as input data as it is for classifying alarm types through clustering. When clustering is performed after obtaining the feature vector of the abstract syntax tree obtained from the source code as the present embodiment and by use thereof, there is an effect of reducing clustering processing time and required resource consumption for the same.

Preferably, the feature pattern set is configured in a set form of n preset feature patterns, and the feature pattern set may be any one of occurrences of conditional statements, occurrences of loop statements, occurrences of return statements, occurrences of break or continue statements, occurrences of exit or assert method invocations, occurrences of null expressions, occurrences of comparisons with a null value, occurrences of null assignments, and occurrences of the statements which return a null value. When the feature pattern sets are summarized in a table, it is as follows.

TABLE 1

| No. | Feature pattern |
|---|---|
| 1 | occurrences of conditional statements |
| 2 | occurrences of loop statements |
| 3 | occurrences of return statements |
| 4 | occurrences of break or continue statements |
| 5 | occurrences of exit or assert method invocations |
| 6 | occurrences of null expressions |
| 7 | occurrences of comparisons with a null value |
| 8 | occurrences of null assignments |
| 9 | occurrences of the statements which return a null value |

In the preferred embodiment, the feature pattern set, for example, a set of n feature patterns is preset for respective alarm types of the error detection alarms. In the case of having the relationship of the above settings, classifications of the alarm types are performed within a range of one specific alarm type.

Preferably, in step S4, the obtaining of a feature vector V(R) of the abstract syntax tree having the unnecessary sub-tree removed therefrom may be performed as follows.

In step S401, the alarm type classifying apparatus defines a feature pattern set P that is formed in a set form of n feature patterns p as the formula 1 below.

$$P=\{p_1,p_2, \ldots ,p_n\} \quad \text{[Formula 1]}$$

In step S402, the alarm type classifying apparatus defines an n-dimensional pattern satisfaction vector v(P,d) for an arbitrary node d within the abstract syntax tree as the formula 2 below.

$$v(P,d)=<S(d,p_1),S(d,p_2), \ldots ,S(d,p_n)> \quad \text{[Formula 2]}$$

(Herein, $S(d,p_i)$ is a factor that indicates whether or not a node d or a sub tree of a root d is matched to an ith feature pattern $p_i$, and is defined as the formula 3 below. The ith feature pattern $p_i$ may be a single node or a sub-tree.)

$$S(d, p) = \begin{cases} 1 & \text{if } d \text{ satisfies } p \\ 0 & \text{otherwise} \end{cases} \quad \text{[Formula 3]}$$

In step S403, the alarm type classifying apparatus defines a feature vector V(P,D) for an arbitrary node D within the abstract syntax tree as the formula 4 below.

$$V(P,D)=V(P,d_1)+ \ldots +V(P,d_m)+v(P,D) \quad \text{[Formula 4]}$$

(Herein, $d_1, \ldots, d_m$ are children nodes of an arbitrary node D, $V(P, d_1) \ldots V(P, d_m)$ are feature vectors of the children nodes $d_1, \ldots, d_m$ that are obtained by using the formula 4, v(P,D) is an n-dimensional pattern satisfaction vector of the arbitrary node D.)

In step S404, the alarm type classifying apparatus obtains a feature vector V(R) of the abstract syntax tree having the unnecessary sub-tree removed therefrom by using the formula 5 below.

$$V(R)=V(P,R)=V(P,d_1)+ \ldots +V(P,d_m)+v(P,R) \quad \text{[Formula 5]}$$

(Herein, R is a root node of the abstract syntax tree having the unnecessary sub-tree removed therefrom, and corresponds to the node D of the formula 4.)

The formula 5 may be also understood as a formula that is obtained by inputting a root node R of the abstract syntax tree having the unnecessary sub-tree removed therefrom as the arbitrary node D of the formula 4.

In step S5, the alarm type classifying apparatus classifies the error detection alarms associated with the feature vectors by types by clustering the obtained feature vectors V(R) using a preset method.

A known vector or data clustering technique may be used for clustering the feature vectors. For example, a known hierarchical clustering technique or non-hierarchical clustering technique may be used.

In the present embodiment, in the preferred embodiment, a K-means algorithm of the non-hierarchical clustering technique may be used. The K-means algorithm relates to a method of finding a centroid of a cluster by minimizing a Euclidean distance between a data (or a vector) and a center of the cluster in which the data (or a vector) belongs.

Since the K-means algorithm has a simple structure and generally has fast convergence characteristics, the K-means algorithm may be applied as a preferred example for the present embodiment. In order to obtain more accurate clustering results, the best result which is obtained by trying several times with different initial values may be used, or clustering may be performed by presetting a number of clusters to an appropriate number.

Feature vectors with high similarities may be classified into the same type by the clustering technique. As a result, respective error detection alarms associated with the feature vectors that are classified to the same type may be classified into the same alarm types. In one embodiment, a detailed condition of the similarity to be classified in to the same type may be preset in the alarm type classifying apparatus.

By classifying the alarm types as described above, developers can obtain various merits in analyzing error detection alarms.

For example, when a new error detection alarm occurs, and the corresponding error detection alarm is not classified as the same type due to the low similarity with the error detection alarm that has been classified as the conventional normal alarm, the developer may determine whether or not to make false alarms preferentially by analyzing the error detection alarm first.

Embodiments of the present invention include a program for performing various computer-implemented operations and a computer-readable storage medium on which the program is recorded. The computer-readable storage medium may include stand-alone or a combination of program instructions, data files, and data structures. The computer-readable storage medium may be specially designed and configured for the present invention, or may also be known and available to those skilled in the computer software field. Examples of the computer-readable storage medium include a magnetic medium, such as a hard disk, a floppy disk, and a magnetic tape; an optical medium, such as a CD-ROM, a DVD, a USB; a magneto-optical medium such as a floptical disk; and a hardware device configured to store and perform program instructions such as a ROM, a RAM, a flash memory, etc. Examples of the program instructions include not only machine language codes made by a compiler but also high-level language codes executable by a device such as computer, for electronically processing information, by using an interpreter.

The invention claimed is:

1. A method for classifying alarm types in detecting source code errors, the method being executed in an alarm type classifying apparatus co-working with a static analyzer, and is for classifying error detection alarms occurring in the static analyzer by types, the method comprising:

1) by the alarm type classifying apparatus, receiving input of alarm path information about an error detection alarm that occurs and source code information that is an object associated with the occurring alarm, the alarm path information being information about an execution path related to the error detection alarm among execution paths of the source code;

2) by the alarm type classifying apparatus, converting the source code into an abstract syntax tree (AST);

3) by the alarm type classifying apparatus, removing, from the AST, an unnecessary sub-tree that is not related to the error detection alarm;

4) by the alarm type classifying apparatus, obtaining a feature vector of the AST having the unnecessary sub-tree removed therefrom based on a preset feature pattern set; and 5) by the alarm type classifying apparatus, classifying, by types, the error detection alarm associated with the feature vector by clustering the obtained feature vector using a preset method, wherein the obtaining of the feature vector (V(R)) of the AST having the unnecessary sub-tree removed therefrom includes:

401) defining a feature pattern set (P) configured in a set form of n preset feature patterns (p) as the formula 1 below:

$$P=\{p_1,p_2, \ldots ,p_n\}; \quad \text{[Formula 1]}$$

402) defining an n-dimensional pattern satisfaction vector (v(P, d)) for an arbitrary node within the AST as the formula 2 below:

$$v(P,d)=\langle S(d,p_1),S(d,p_2), \ldots ,S(d,p_n)\rangle \quad \text{[Formula 2]}$$

wherein $S(d,p_i)$ is a factor that indicates whether or not a node d or a sub tree of a root d is matched to an ith feature pattern pi, and is defined as the formula 3 below; wherein the ith feature pattern $(p_i)$ may be a single node or a sub-tree, $$S(d,p)=\begin{cases}1 & \text{if } d \text{ satisfies } p\\ 0 & \text{otherwise}\end{cases}; \quad \text{[Formula 3]}$$

403) defining a feature vector (V(P,D)) for an arbitrary node within the AST by using the formula 4 below:

$$V(P,D)=V(P,d_1)+\ldots+V(P,d_m)+v(P,D) \quad \text{[Formula 4]}$$

wherein $d_1, \ldots, d_m$ are children nodes of D, $(V(P,d_1) \ldots V(P,d_m)$ are feature vectors of $d_1, \ldots d_m$ that are obtained by using the formula 4, and v(P,D) is an n-dimensional pattern satisfaction vector of an arbitrary node D; and 404) obtaining a feature vector (V(R)) of the AST having the unnecessary sub-tree removed therefrom by using the formula 5 below:

$$V(R)=V(P,R)=V(P,d_1)+\ldots+V(P,d_m)+v(P,R) \quad \text{[Formula 5]}$$

wherein R is a root node of the AST having the unnecessary sub-tree removed therefrom, and corresponds to the node D of the formula 4.

2. The method of claim 1, wherein the receiving of the alarm path information and source code information input further receives input of alarm type information about the occurring error detection alarm, the alarm type information is information about an alarm type associated with the occurring error detection alarm among preset alarm types, and in the obtaining of the feature vector, the preset feature pattern set is preset for the alarm type of the error detection alarm.

3. The method of claim 1, wherein the removing of the unnecessary sub-tree is performed based on at least any one of: a first policy of removing general statements except for statements which are executed within an execution path related to the error detection alarm; a second policy of removing branch nodes that are not executed branch nodes within the execution path related to the error detection alarm, wherein the execution path related to the error detection alarm includes information about condition determination results of branch nodes; a third policy of removing loop statements that are not executed loop statements within the execution path related to the error detection alarm; a fourth policy of including a called function within the execution path related to the error detection alarm and an execution path thereof as a sub-tree of a node which calls the function; and a fifth policy of removing declarations that are not related to the execution path related to the error detection alarm.

4. The method of claim 1, wherein in the obtaining of the feature vector of the AST having the unnecessary sub-tree removed therefrom based on the preset feature pattern set, the preset feature pattern set is configured in a set form of n preset feature patterns, and the feature pattern is any one of occurrences of conditional statements, occurrences of loop statements, occurrences of return statements, occurrences of break or continue statements, occurrences of exit or assert method invocations, occurrences of null expressions, occurrences of comparisons with a null value, occurrences of null assignments, and occurrences of the statements which return a null value.

5. The method of claim 1, wherein in the classifying of the error detection alarm, the clustering of the obtained feature vector is performed by using a K-means algorithm.

6. A non-transitory computer readable recording medium storing a computer program for executing a method for classifying alarm types in detecting source code errors at a computer, the method being executed in an alarm type classifying apparatus co-working with a static analyzer, and is for classifying error detection alarms occurring in the static analyzer by types, the method comprising:

1) receiving input of alarm path information about an error detection alarm that occurs and source code information that is an object associated with the occurring alarm, the alarm path information being information about an execution path related to the error detection alarm among execution paths of the source code;

2) converting the source code into an abstract syntax tree (AST);

3) removing, from the AST, an unnecessary sub-tree that is not related to the error detection alarm;

4) obtaining a feature vector of the AST having the unnecessary sub-tree removed therefrom based on a preset feature pattern set; and 5) classifying, by types, the error detection alarm associated with the feature vector by clustering the obtained feature vector using a preset method, wherein the obtaining of the feature vector (V(R)) of the AST having the unnecessary sub-tree removed therefrom includes:

401) defining a feature pattern set (P) configured in a set form of n preset feature patterns (p) as the formula 1 below:

$$P=\{p_1,p_2,\ldots p_n\} \quad \text{[Formula 1]}$$

402) defining an n-dimensional pattern satisfaction vector (v(P, d)) for an arbitrary node within the AST as the formula 2 below:

$$v(P,d)=\langle S(d,p_1),S(d,p_2),\ldots,S(d,p_n)\rangle \quad \text{[Formula 2]}$$

wherein $S(d,p_i)$ is a factor that indicates whether or not a node d or a sub tree of a root d is matched to an ith feature pattern pi, and is defined as the formula 3 below; wherein the ith feature pattern $(p_i)$ may be a single node or a sub-tree, $$S(d,p)=\begin{cases}1 & \text{if } d \text{ satisfies } p\\ 0 & \text{otherwise}\end{cases}; \quad \text{[Formula 3]}$$

403) defining a feature vector (V(P,D)) for an arbitrary node within the AST by using the formula 4 below:

$$V(P,D)=V(P,d_1)+\ldots+V(P,d_m)+v(P,D) \quad \text{[Formula 4]}$$

wherein $d_1, \ldots, d_m$ are children nodes of D, $(V(P,d_1) \ldots V(P,d_m)$ are feature vectors of $d_1 \ldots d_m$ that are obtained by using the formula 4, and v(P,D) is an n-dimensional pattern satisfaction vector of an arbitrary node D; and 404) obtaining a feature vector (V(R)) of the AST having the unnecessary sub-tree removed therefrom by using the formula 5 below:

$$V(R)=V(P,R)=V(P,d_1)+\ldots+(P,d_m)+v(P,R) \quad \text{[Formula 5]}$$

wherein R is a root node of the AST having the unnecessary sub-tree removed therefrom, and corresponds to the node D of the formula 4.

* * * * *